United States Patent
Nagura et al.

(10) Patent No.: US 9,628,961 B2
(45) Date of Patent: Apr. 18, 2017

(54) WIRELESS POSITIONING TERMINAL

(71) Applicant: DENSO CORPORATION, Kariya, Aichi-pref. (JP)

(72) Inventors: Toru Nagura, Kariya (JP); Tsuneo Nakata, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 15/156,365

(22) Filed: May 17, 2016

(65) Prior Publication Data

US 2016/0345133 A1 Nov. 24, 2016

(30) Foreign Application Priority Data

May 21, 2015 (JP) ................. 2015-103988

(51) Int. Cl.
*H04W 76/02* (2009.01)
*H04W 4/02* (2009.01)
*H04W 4/04* (2009.01)
*H04B 17/318* (2015.01)

(52) U.S. Cl.
CPC .......... *H04W 4/028* (2013.01); *H04B 17/318* (2015.01); *H04W 4/046* (2013.01)

(58) Field of Classification Search
CPC ......... G09G 5/10; G09G 3/002; B60W 30/12; B60W 30/143; H04N 1/00392; H04N 5/23203; H04N 1/00214; H04W 4/028; H04W 4/046; H04B 17/318; G01S 5/0221; G01S 5/0263; B60L 11/1831; B60L 11/1833; H04L 67/02; H04L 61/2528; H04L 67/28

USPC ....... 455/422.1, 456.2, 456.1; 370/338, 432; 345/419; 348/47; 702/128
See application file for complete search history.

(56) References Cited

U.S. PATENT DOCUMENTS

| | | | |
|---|---|---|---|
| 8,705,321 B2 * | 4/2014 | Akiyama | G04G 5/002 368/21 |
| 2012/0023333 A1 * | 1/2012 | Takada | G01S 5/0027 713/168 |
| 2013/0310067 A1 | 11/2013 | Nakata et al. | |

FOREIGN PATENT DOCUMENTS

JP 2013-257306 A 12/2013

* cited by examiner

*Primary Examiner* — Phuoc H Doan
(74) *Attorney, Agent, or Firm* — Harness, Dickey & Pierce, P.L.C.

(57) ABSTRACT

A wireless positioning terminal includes a wireless receiver receiving reception signals from a wireless transmitter via multiple communication links. A multi-link-base reception informational item is determined by evaluating reception signals via the communication links. The multi-link-base reception informational item, which has a value varying with a position of the wireless positioning terminal, varies with the position differently from an informational item of a reception signal via one of the communication links. A base trajectory is stored which represents correspondence relation about points between (i) a position of the wireless positioning terminal and (ii) the multi-link-base reception informational item. A measured trajectory is generated which represents correspondence relation about points between (i) a calculated position variation and (ii) the multi-link-base reception informational item. A current position of the wireless positioning terminal is estimated based on a matching between the base trajectory and the measured trajectory.

6 Claims, 13 Drawing Sheets

BASE MEASURING TERMINAL

WIRELESS POSITIONING TERMINAL

IN BASE MEASURING TERMINAL 30

IN SERVER 50

IN WIRELESS POSITIONING TERMINAL 40

IN SERVER 50

IN WIRELESS POSITIONING TERMINAL 40

WIRELESS POSITIONING TERMINAL

CROSS REFERENCE TO RELATED APPLICATION

The present application is based on Japanese Patent Application No. 2015-103988 filed on May 21, 2015, the disclosure of which is incorporated herein by reference.

TECHNICAL FIELD

The present disclosure relates to a wireless positioning terminal that performs positioning using wireless communication.

BACKGROUND ART

Patent literature 1: JP 2013-257306 A (US 2013/0310067 A1)

There is known a wireless communication apparatus disclosed in patent literature 1 as a terminal to perform positioning using wireless communication. According to an embodiment disclosed in patent literature 1, the wireless communication apparatus is mounted on a vehicle and stores base trajectory information. The base trajectory information provides correspondence relation between a distance from the base point on a road near a base station and a received signal strength indicator (RSSI) for data transmitted from the base station. The wireless communication apparatus receives data from the base station and generates probe trajectory information. The probe trajectory information represents correspondence relation between the RSSI for data received from the base station and a traveled distance.

The wireless communication apparatus accumulates the probe trajectory information so as to maximize correlation with the base trajectory information. The wireless communication apparatus estimates the current position of the vehicle mounted with the wireless communication apparatus from the position corresponding to the probe trajectory information at the time. Patent literature 1 also discloses that the RSSI may be replaced by TOF (Time of Flight) or an angle of arrival of radio wave.

SUMMARY

When the change in the RSSI due to the change in the vehicle position is insufficiently small, the accuracy of matching reduces between the probe trajectory information (hereinafter referred to as a probe trajectory) and the base trajectory information (hereinafter referred to as a base trajectory). Therefore, an insufficiently small change in the RSSI involved by the change in the vehicle position results in decreasing position estimation accuracy. Elongating an interval to determine a matching improves the accuracy of matching between the probe trajectory and the base trajectory but increases the time to estimate a position.

Disturbance in features due to an environmental change degrades reproducibility of the probe trajectory and degrades reliability of matching between the probe trajectory and the base trajectory. Disturbance in features due to an environmental change therefore degrades the reliability of an estimated position.

It is an object of the present disclosure to provide a wireless positioning terminal capable of estimating a current position highly accurately, highly reliably, and quickly.

According to an example of the present disclosure, a wireless positioning terminal is provided as including a wireless receiver to receive signals wirelessly from at least one wireless transmitter via a plurality of different communication links that are mutually different from each other, as a plurality of reception signals. The wireless positioning terminal further includes a reception information determiner, a base memory, a position variation calculator, a trajectory generator, and a position estimator. The reception information determiner is to successively determine a multi-link-base reception informational item by evaluating the plurality of reception signals respectively corresponding to the different communication links, the multi-link-base reception informational item including a value varying with a position of the wireless positioning terminal, the multi-link-base reception informational item varying with a position of the wireless positioning terminal differently from an informational item of a reception signal received the wireless receiver via one of the different communication links. The base memory is to store a base trajectory that represents correspondence relation about a plurality of points between (i) a position of the wireless positioning terminal and (ii) the multi-link-base reception informational item as a base reception informational item. The position variation calculator is to successively calculate a position variation in the wireless positioning terminal. The trajectory generator is to generate a measured trajectory that represents correspondence relation about a plurality of points between (i) the position variation calculated by the position variation calculator and (ii) the multi-link-base reception informational item determined by the reception information determiner. The position estimator is to estimate, as a current position of the wireless positioning terminal, a current point on the measured trajectory that is moved based on matching between the base trajectory stored in the base memory and the measured trajectory generated by the trajectory generator. That is, the measured trajectory, which has a current point on the measured trajectory itself, is moved based on the matching or matching position to be matched with the base trajectory. The current point moved along with the measured trajectory is estimated as the current position of the wireless positioning terminal.

The wireless positioning terminal according to the above example determines multi-link-base reception information (or informational item). The multi-link-base reception information results from evaluating reception signals the wireless receiver receives from the wireless transmitter via several different communication paths or links. A value of the multi-link-base reception information varies with a position of the wireless positioning terminal. In addition, the multi-link-base reception information varies with a position of the wireless positioning terminal differently from single-link-base reception information (or information item) that is information about a signal received by the wireless receiver from the wireless transmitter via the single communication path or link, in respect of the tendency in varying. The measured trajectory represents the correspondence relation among several points between the multi-link-base reception information and the position variation. The measured trajectory is thus shaped differently from a trajectory (hereinafter referred to as a single-link-base trajectory) representing the correspondence relation between the position variation and the single-link-base reception information about a signal received by the wireless receiver from the wireless transmitter via the single communication path or link.

The measured trajectory according to the above example is shaped differently from the single-link-base trajectory and can generate a remarkable characteristic shape at a point where the single-link-base trajectory causes little characteristics. Such a remarkable characteristic shape enables the measured trajectory according to the example to highly accurately determine a matching position corresponding to the base trajectory. The measured trajectory according to the example can therefore highly accurately determine a matching position corresponding to the base trajectory. The capability of generating a remarkable characteristic shape can shorten an interval used for the matching and can increase chances to determine successful matching despite an increase in a threshold value to determine successful matching. The measured trajectory according to the example of the present disclosure can quickly and highly reliably estimate the current position.

DESCRIPTION OF EMBODIMENTS

Embodiments of the present disclosure will be described in further detail with reference to the accompanying drawings.

First Embodiment (Configuration of Wireless Positioning System 10)

Figure 1:
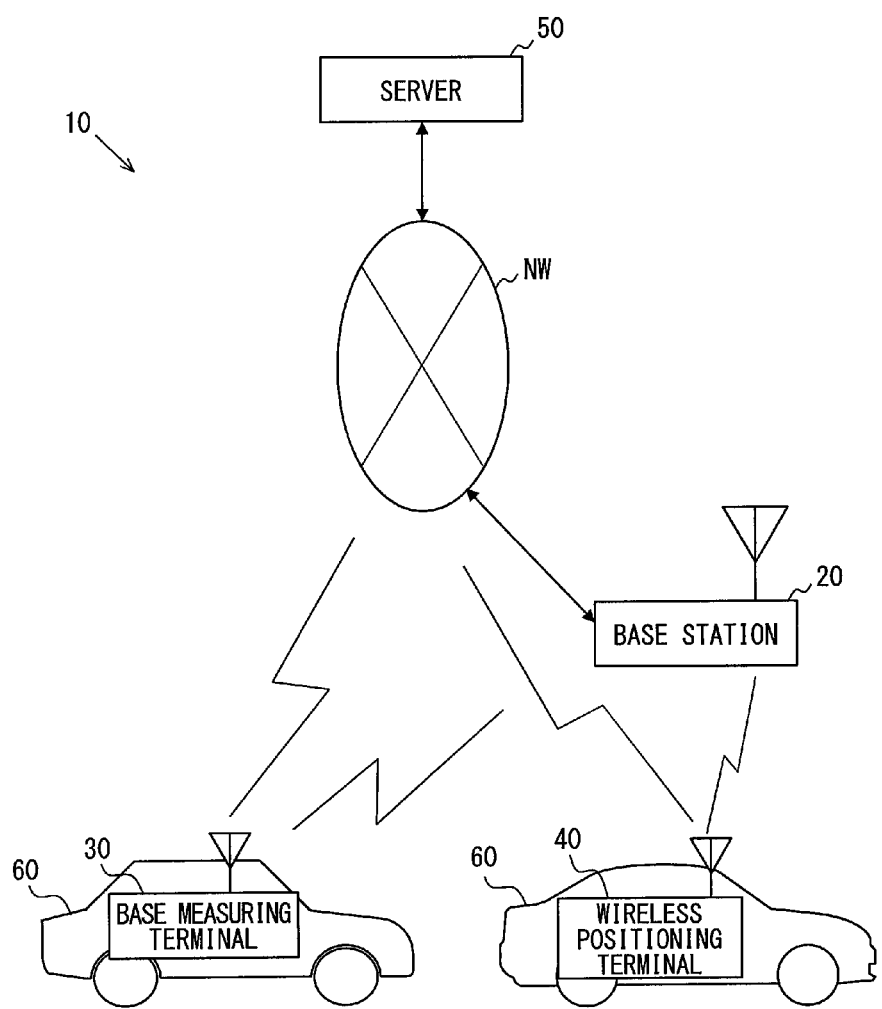
FIG. 1 is an overall configuration diagram illustrating a wireless positioning system according to a first embodiment.

As in FIG. 1, a wireless positioning system 10 according to a first embodiment includes a base station 20, a base measuring terminal 30, a wireless positioning terminal 40, and a management server 50. The base measuring terminal 30 and the wireless positioning terminal 40 are mounted to corresponding vehicles 60. Although FIG. 1 illustrates only one base measuring terminal 30 and only one wireless positioning terminal 4 as just an example, multiple base measuring terminals 30 may naturally be included in the wireless positioning system 10 while multiple wireless positioning terminals 40 may naturally be included in the wireless positioning system 10.

The base station 20 is provided for each of position estimation areas where the wireless positioning terminal 40 is used for position estimation while FIG. 1 illustrates only one base station 20. The size of the position estimation area signifies the size of a communication area for the base station 20.

The base station 20 corresponds to a wireless transmitter. The base station 20 periodically transmits a radio wave containing identification information about the base station 20 into the communication area for the base station 20. A radio wave transmitted from the base station 20 is hereinafter referred to as a base station radio wave. It is noted that in the embodiments, information is used as being not only uncountable but also countable; an informational item may be equivalent to information while informational items may be equivalent to informations. The base station 20 corresponds to a communication unit (or a roadside unit) installed at the roadside. A broadcast station such as a radio station or a television station may be used as the base station 20. The base station 20 as a roadside unit uses the position estimation area with a radius of several hundreds of meters, for example. The base station 20 as a broadcast station uses the position estimation area with a radius of several tens of kilometers.

The system to transmit base station radio waves may apply to transmission not specifying communications partners such as broadcasting or to a system that specifies communications partners. The communication according to the present embodiment includes communication based on the broadcast system.

The broadcast system and the system not specifying communications partners can use direct communication and relay communication. The direct communication provides communication without using other equipment such as a relay station. The relay communication uses a retransmission facility.

The base station 20 can communicate with the management server 50 via wide area radio communication network NW such as a mobile telephone communication network.

The base measuring terminal 30 is mounted on the vehicle 60 and generates reception state information to generate a multi-base trajectory to be described later. The number of base measuring terminals 30 is not specified. The base measuring terminal 30 directly and wirelessly communicates with the base station 20 and communicates with the management server 50 via wide area radio communication network NW.

The wireless positioning terminal 40 generates a multi-probe trajectory to be described. The wireless positioning terminal 40 is mounted on the vehicle 60. The wireless positioning terminal 40 estimates the current position of the vehicle 60 mounted with the wireless positioning terminal 40 based on comparison between a multi-probe trajectory and a multi-base trajectory. Similarly to the base measuring terminal 30, the wireless positioning terminal 40 also directly and wirelessly communicates with the base station 20 and communicates with the management server 50 via wide area radio communication network NW.

The management server 50 manages multi-base trajectories used to estimate the current position of the wireless positioning terminal 40. Specifically, the management server 50 generates, updates, and transmits the multi-probe trajectory to the wireless positioning terminal 40. The multi-probe trajectory may be transmitted to the wireless positioning terminal 40 via the base station 20.

(Configuration of Base Measuring Terminal 30)

Figure 2:
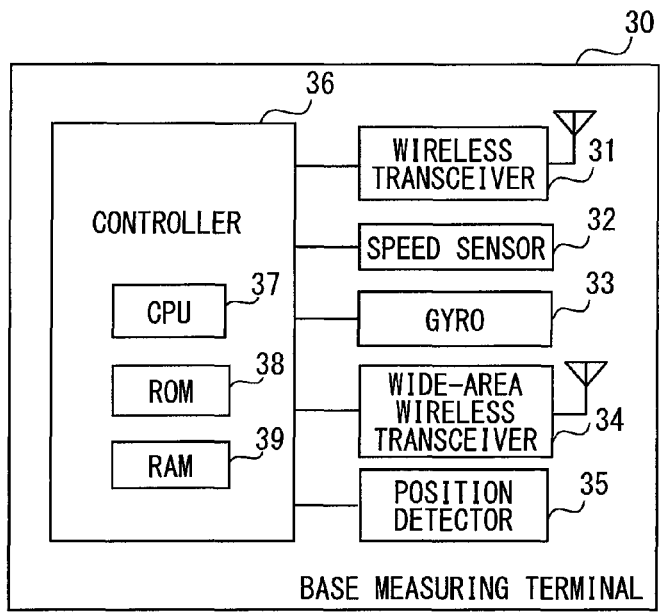
FIG. 2 is a configuration diagram illustrating a base measuring terminal in FIG. 1.

As in FIG. 2, the base measuring terminal 30 includes a wireless transceiver 31, a vehicle speed sensor 32, a gyro sensor 33, a wide area wireless transceiver 34, a position detector 35, and a controller 36.

The wireless transceiver 31 receives a base station radio wave. The vehicle speed sensor 32 detects a speed (or a vehicle speed) of the vehicle 60 mounted with the vehicle speed sensor 32. The vehicle speed detected by the vehicle speed sensor 32 is input to the controller 36.

The gyro sensor 33 detects an angular velocity generated in the vehicle 60 mounted with the gyro sensor 33. The gyro sensor 33 is provided as a triaxial gyro sensor that detects a speed change at a yaw angle, a roll angle, and a pitch angle. The vehicle speed sensor 32 and the gyro sensor 33 are used to calculate a positional change of the vehicle 60 with reference to a given time.

The wide area wireless transceiver 34 communicates with the management server 50 via wide area radio communication network NW.

The position detector 35 includes a GNSS receiver used for GNSS (Global Navigation Satellite System) that detects the apparatus position based on a radio wave from a satellite. The position detector 35 detects absolute coordinates for the current position based on a signal received by the GNSS receiver. The description below assumes that the current position is represented in absolute coordinates. The position detector 35 may detect the current position using detection values from various sensors such as the vehicle speed sensor 32 and the gyro sensor 33 as well as the GNSS receiver or using road map data.

The controller 36, which may be also referred to as an electronic control unit, includes a CPU 37, ROM 38, and RAM 39. The CPU 37 performs a process based on a program stored in the ROM 38. The controller 36 thereby controls the wireless transceiver 31 and the wide area wireless transceiver 34. The controller 36 generates the reception state information to generate a multi-base trajectory based on the base station radio wave received by the wireless transceiver 31. The controller 36 performs a process to transmit the generated reception state information to the management server 50. The process performed by the controller 36 will be described in detail later.

(Configuration of Wireless Positioning Terminal 40)

Figure 3:
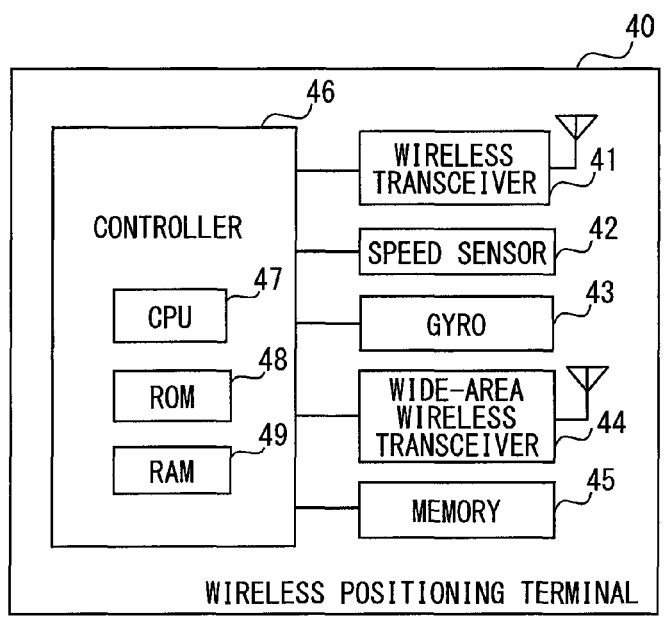
FIG. 3 is a configuration diagram illustrating a wireless positioning terminal in FIG. 1.

As in FIG. 3, the wireless positioning terminal 40 includes a wireless transceiver 41, a vehicle speed sensor 42, a gyro sensor 43, a wide area wireless transceiver 44, memory 45, and a controller 46. Of these, the wireless transceiver 41, the vehicle speed sensor 42, the gyro sensor 43, and the wide area wireless transceiver 44 may be replaced by the wireless transceiver 31, the vehicle speed sensor 32, the gyro sensor 33, and the wide area wireless transceiver 34, respectively, included in the base measuring terminal 30. The wireless transceiver 41 corresponds to a wireless receiver. Unlike the base measuring terminal 30, the wireless positioning terminal 40 need not necessarily include the position detector 35.

The memory 45 is writable and nonvolatile and stores the multi-base trajectory. According to the embodiment, the management server 50 generates the multi-base trajectory. The multi-base trajectory is transmitted to the wireless positioning terminal 40 and are stored in the memory 45. As will be described in detail later, the multi-base trajectory corresponds to a base trajectory. The memory 45 to store the multi-base trajectory corresponds to base memory.

The controller 46, which may be also referred to as an electronic control unit, includes a CPU 47, ROM 48, and RAM 49. The CPU 47 performs a process based on a program stored in the ROM 48. The controller 46 thereby controls the wireless transceiver 41 and the wide area wireless transceiver 44. The controller 46 generates the multi-probe trajectory based on the base station radio wave received by the wireless transceiver 41. The controller 46 estimates the current position of the vehicle 60 mounted with the wireless positioning terminal 40 using the generated multi-probe trajectory and multi-base trajectory. The process performed by the controller 46 will be also described in detail later.

(Arrangement of Antennas)

Figure 4:
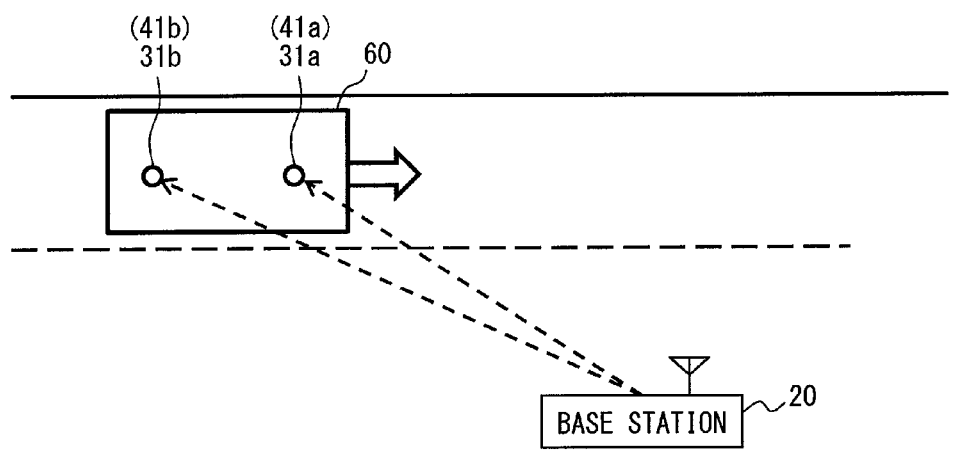
FIG. 4 is a diagram illustrating arrangement of antennas provided for the base measuring terminal and the wireless positioning terminal according to the first embodiment.

FIG. 4 illustrates arrangement of a first antenna 31*a* and a second antenna 31*b* included in the wireless transceiver 31 according to the first embodiment. As in FIG. 4, the wireless transceiver 31 includes two antennas 31*a* and 31*b*. The two antennas 31*a* and 31*b* are arranged along a front-back direction of the vehicle 60.

As above, the wireless transceiver 31 included in the base measuring terminal 30 is configured equally to the wireless transceiver 41 included in the wireless positioning terminal 40. A first antenna 41*a* and a second antenna 41*b* included in the wireless transceiver 41 are therefore arranged along a front-back direction of the vehicle 60 mounted with the wireless positioning terminal 40.

The two antennas 31*a* and 31*b* included in the wireless transceiver 31 and the two antennas 41*a* and 41*b* included in the wireless transceiver 41 are each capable of receiving a base station radio wave transmitted from the base station 20.

The wireless transceiver 31 receives a base station radio wave using two communication paths (several types of communication paths) because the two antennas 31*a* and 31*b* each receive a base station radio wave. The communication path is hereinafter referred to as a link. The wireless transceiver 41 also receives a base station radio wave using two links because the two antennas 41*a* and 41*b* each receive a base station radio wave.

(Configuration of Management Server 50)

Figure 5:
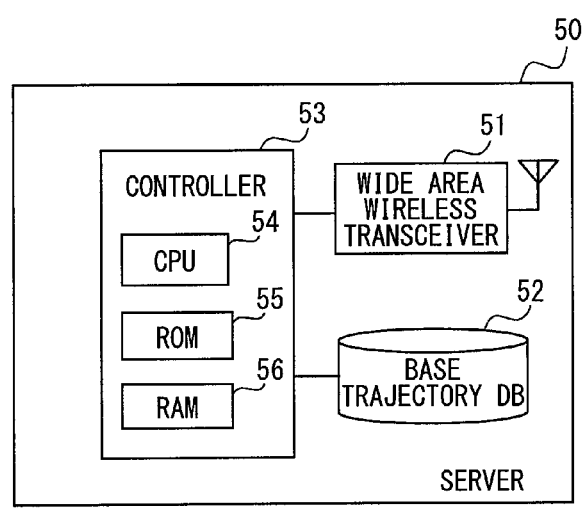
FIG. 5 is a configuration diagram illustrating a management server in FIG. 1.

As in FIG. 5, the management server 50 includes a wide area wireless transceiver 51, a base trajectory database 52, and a controller 53.

The wide area wireless transceiver 51 communicates with the base station 20, the base measuring terminal 30, and the wireless positioning terminal 40 via wide area radio communication network NW. The base trajectory database 52 stores multi-base trajectories corresponding to the base stations 20.

The controller 53, which may be also referred to as an electronic control unit, includes a CPU 54, ROM 55, and RAM 56. The CPU 54 performs a process based on a program stored in the ROM 55. The controller 53 thereby controls the wide area wireless transceiver 51 and manages the base trajectory database 52. The process performed by the controller 53 will be also described in detail later.

(Process Performed by the Controller 36 of the Base Measuring Terminal 30)

Figure 6:
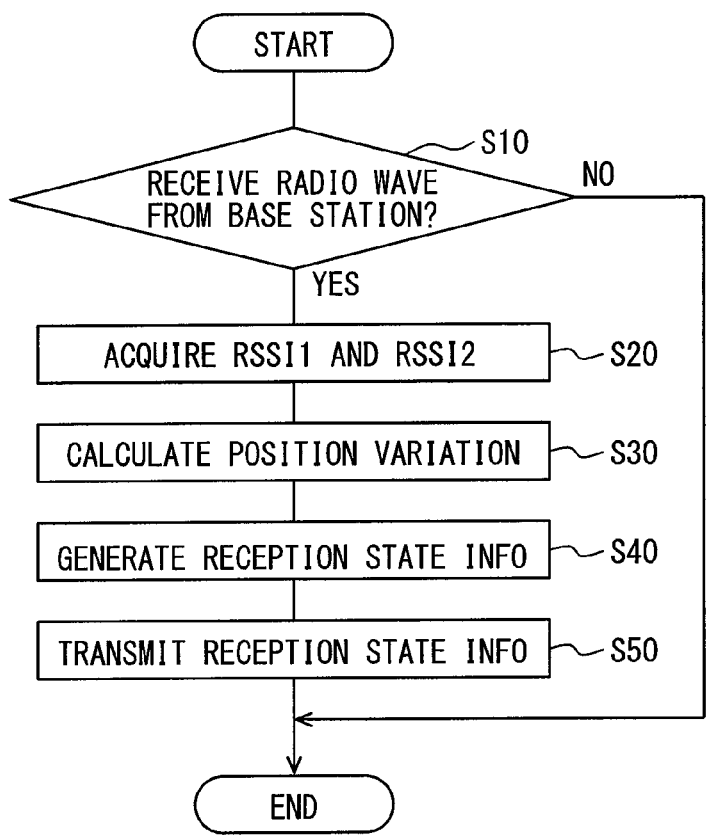
FIG. 6 is a flowchart illustrating a process performed by a controller of the base measuring terminal according to the first embodiment.

The controller 36 of the base measuring terminal 30 periodically performs the process in FIG. 6.

It is noted that flowcharts in the present application includes sections (also referred to as steps), each of which is represented, for instance, as S10. Further, each section can be divided into several sub-sections while several sections can be combined into a single section. Furthermore, each of thus configured sections can be also referred to as a device, module, or a specific name. For instance, a determination section may be referred to as a determination device, a determination module, or a determiner, which may be modified with a structural word. Each or any combination of sections explained in the above can be achieved as (i) a software section in combination with a hardware unit (e.g., computer) or (ii) a hardware section, including or not including a function of a related apparatus; furthermore, the hardware section (e.g., integrated circuit, hard-wired logic circuit) may be constructed inside of a microcomputer.

At S10, the controller 36 determines whether the wireless transceiver 31 receives a base station radio wave transmitted from the base station 20. The controller 36 terminates the process in FIG. 6 if the determination results in NO. After terminating the process in FIG. 6, the controller 36 reexecutes the process in FIG. 6 at the time to perform the process.

The controller 36 proceeds to S20 if the determination at S10 results in YES. At S20, the controller 36 acquires RSSI1 and RSSI2 from the wireless transceiver 31. RSSI1 signifies RSSI of a base station radio wave received at the first antenna 31a. RSSI2 signifies RSSI of a base station radio wave received at the second antenna 31b. RSSI1 and RSSI2 each correspond to a single-link-base reception informational item, a single-link-base reception parameter, or a single-link-base reception property. The controller 36 may include a function to determine RSSI1 and RSSI2.

At S30, the controller 36 calculates a position variation in the vehicle 60 mounted with the base measuring terminal 30 after previous execution of the process in FIG. 6 until current execution of the same each time the process in FIG. 6 is performed on condition that the base station radio wave can be received. The controller 36 calculates the position variation by acquiring signals from the vehicle speed sensor 32 and the gyro sensor 33. The position variation provides information that contains a distance and a direction.

At S40, the controller 36 acquires the current position from the position detector 35. The controller 36 generates reception state information by appending the current position (i.e., absolute coordinates) to RSSI1 and RSSI2 acquired at S20 and the position variation calculated at S30. RSSI1, RSSI2, the position variation, and the current position are therefore associated with each other.

At S50, the controller 36 transmits the reception state information generated at S40 to the management server 50 using the wide area wireless transceiver 34.

(Process Performed by the Controller 53 of the Management Server 50)

Figure 7:
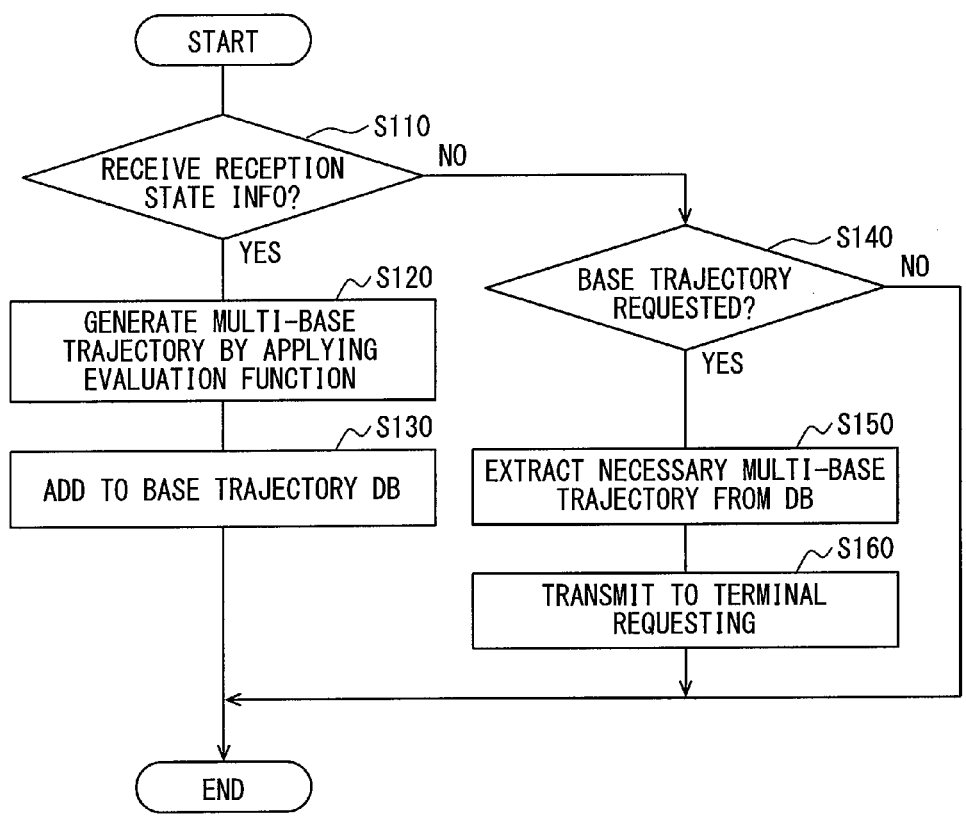
FIG. 7 is a flowchart illustrating a process performed by a controller of the management server according to the first embodiment.

The controller 53 of the management server 50 periodically performs the process in FIG. 7. At S110, the controller 53 determines whether the reception state information is received. The base measuring terminal 30 transmits the reception state information when the process is performed at S50 in FIG. 6. The controller 53 proceeds to S120 if the determination at S110 results in YES. At S120, the controller 53 generates a multi-base trajectory by applying an evaluation function to the received reception state information. At S130, the controller 53 appends the multi-base trajectory generated at S120 to the base trajectory database 52. The controller 53 terminates the process in FIG. 7 after S130.

The controller 53 may update the multi-base trajectory stored in the base trajectory database 52 by averaging several multi-base trajectories generated from the reception state information that is transmitted from several base measuring terminals 30 and represents the same road interval. Alternatively, the controller 53 may update the multi-base trajectory stored in the base trajectory database 52 by choosing from multi-base trajectories. The identification of the same road interval can be favorably ensured based on the current position contained in the reception state information also in consideration of a lane.

Figure 8:
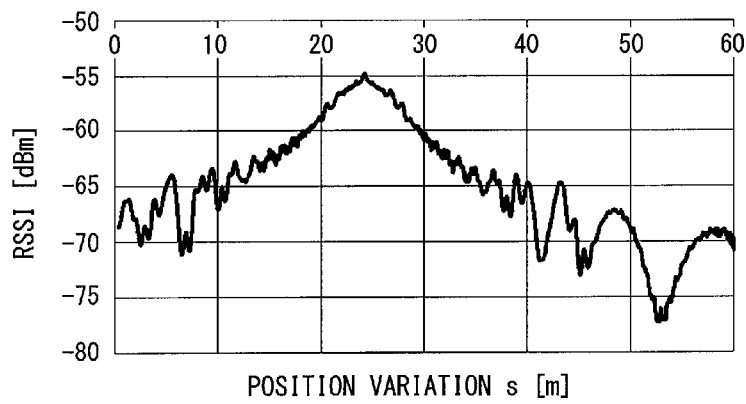
FIG. 8 illustrates a probe trajectory generated from RSSI1.
Figure 9:
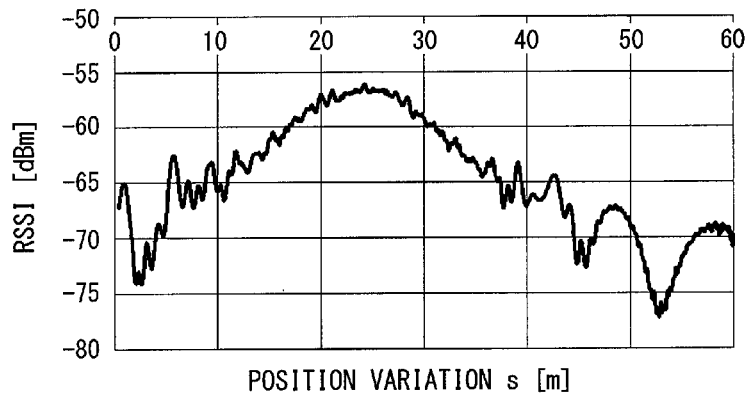
FIG. 9 illustrates a probe trajectory generated from RSSI2.

The multi-base trajectory will be described with reference to FIGS. 8 through 10. FIG. 8 illustrates a probe trajectory generated from RSSI1. FIG. 9 illustrates a probe trajectory generated from RSSI2. In FIGS. 8 and 9, the horizontal axis represents position variation s and the vertical axis represents RSSI. Though not shown, position variation s is associated with the current position.

The embodiment estimates the current position of the wireless positioning terminal 40 based on matching between the multi-base trajectory and the multi-probe trajectory. Suppose the matching by assuming the base trajectory to f(s) and the probe trajectory to be g(s). This matching searches for T that maximizes Rfg(T) in equation 1. Probe trajectory g(s) represents the relation between RSSI generated from one link and position variation s using a combination of several position variations s and RSSIs. Base trajectory f(s) is generated from probe trajectory g(s) unchanged or is generated by averaging probe trajectories g(s) acquired from several base measuring terminals 30.

$$R_{fg}(\tau) = \int_{-D_1}^{D_2} f(s) g(s-\tau) ds \quad (1)$$

The use of composite function Rmulti(τ) in equation 2 often improves the matching accuracy when several links can receive the base station radio wave. In equation 2, function Rf1g1 represents the correlation between function f1 representing the base trajectory corresponding to RSSI1 and function g1 representing the probe trajectory generated from RSSI1. Function Rf2g2 represents the correlation between function f2 representing the base trajectory corresponding to RSSI2 and function g2 representing the probe trajectory generated from RSSI2.

$$R_{multi}(\tau) = R_{f1g1}(\tau) \times R_{f2g2}(\tau) \quad (2)$$

However, the probe trajectory generated from RSSI1 may be similar to the probe trajectory generated from RSSI2. Namely, these probe trajectories may maintain high correlation. In such a case, the use of composite function Rmulti (τ) less improves the matching accuracy than expected.

The description below explains why the matching accuracy less improves than expected. Equation 3 expresses the correlation between probe trajectories.

$$R_{g1g2} = \int_{-D_1}^{D_2} g1(s) g2(s) ds \quad (3)$$

Increasing Rg1g2 changes equation 2 to equation 4.

$$R_{multi}(\tau) \cong R_{f1g1}^2(\tau) - \quad (4)$$

The matching accuracy is insufficient if several peaks are contained in autocorrelation function Rg1g1(τ) expressed by equation 5.

$$R_{g1g1}(\tau) = \int_{-D_1}^{D_2} g1(s)g1(s-\tau)ds \qquad (5)$$

Even equation 4 contains several peaks if the matching uses a narrow interval when several peaks are contained in autocorrelation function Rg1g1(τ) expressed by equation 5. Therefore, the matching accuracy less improves than expected even if composite function Rmulti(τ) is used as the base trajectory. Elongating an interval used for the matching increases a possibility of allowing the probe trajectory to contain only one portion similar to the base trajectory in the entire interval even if the probe trajectory locally contains several portions similar to the base trajectory. The matching accuracy can therefore improve. However, elongating an interval used for the matching increases the time for the wireless positioning terminal 40 to travel the interval and accordingly increases the time to estimate the current position.

To solve this, the embodiment generates a multi-base trajectory (i.e. multi-link-base trajectory), which is a trajectory obtained on the basis of multiple links or multiple communication paths, by applying the evaluation function to the reception state information containing information about signals received by several links. The embodiment uses evaluation function g1(s)-g2(s). A trajectory generated by applying this evaluation function is used as a multi-probe trajectory. Function gm(s) expresses the multi-probe trajectory. Function gm(s), when used as a base trajectory, is represented as fm(s) in which f signifies the function of the base trajectory. A trajectory expressed in fm(s) is the multi-base trajectory. The multi-base trajectory corresponds to a base trajectory. Values of the vertical axis in the multi-probe trajectory or the multi-base trajectory correspond to a multi-link-base reception informational item, a multi-link-base reception parameter, or a multi-link-base reception property. The horizontal axis in FIGS. 8 through 10 represents position variation s. As described at S40 in FIG. 6, however, absolute coordinates are associated with position variation s. The horizontal axis in the multi-base trajectory therefore also represents absolute coordinates.

Multi-base trajectory fm(s) results from g1(s)-g2(s). Multi-base trajectory fm(s) is shaped similarly to a first derivative for probe trajectory g1(s) or probe trajectory g2(s) when high correlation is maintained between probe trajectory g1(s) and probe trajectory g2(s). FIG. 10 illustrates multi-base trajectory fm(s) generated from g1(s)-g2(s), where g1(s) expresses the probe trajectory in FIGS. 8 and g2(s) expresses the probe trajectory in FIG. 9.

Multi-base trajectory fm(s) provides information based on RSSI to evaluate base station radio waves received by the wireless transceiver 31 using two links. Values of multi-base trajectory fm(s) vary with positions of the base measuring terminal 30 because multi-base trajectory fm(s) provides information resulting from evaluating RSSI. As seen from comparison among FIGS. 8, 9, and 10, multi-base trajectory fm(s) varies with positions of the base measuring terminal 30 differently from RSSI for base station radio waves received by the wireless transceiver 31 using one link.

The wireless transceiver 31 and the wireless transceiver 41 are configured equally. Therefore, multi-base trajectory fm(s) can be assumed to be information based on RSSI to evaluate base station radio waves received by the wireless transceiver 41 using two links. Values of multi-base trajectory fm(s) vary with positions of the wireless positioning terminal 40. In addition, multi-base trajectory fm(s) varies with positions of the wireless positioning terminal 40 differently from RSSI for base station radio waves received by the wireless transceiver 41 using one link.

Equation 6 expresses correlation between multi-base trajectory fm(s) and base trajectory f1(s) by unalterably using probe trajectory g1(s) generated from RSSI1.

$$R_{f1fm} = \int_{-D_1}^{D_2} f1(s)fM(s)ds \qquad (6)$$

Figure 10:
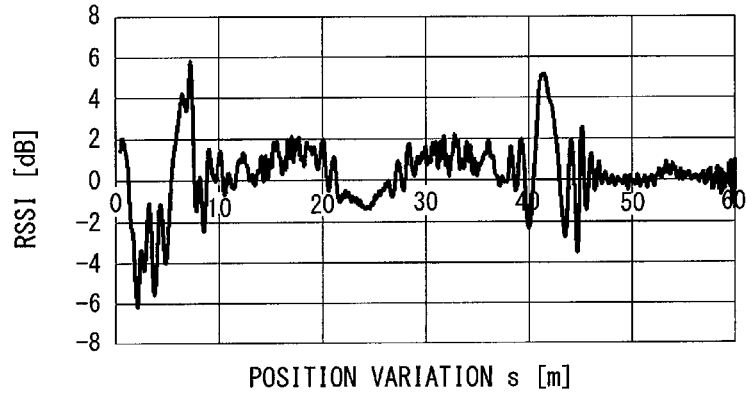
FIG. 10 illustrates multi-base trajectory fm(s) generated from the probe trajectory in FIG. 8 and the probe trajectory in FIG. 9.

As seen from comparison among FIGS. 8, 9, and 10, increasing the correlation between two probe trajectories g1(s) and g2(s) decreases the maximum value of the correlation function expressed in equation 6 when the evaluation function according to the embodiment is used. Namely, increasing the correlation between two probe trajectories g1(s) and g2(s) decreases the correlation between multi-base trajectory fm(s) and each of probe trajectories g1(s) and g2(s).

Multi-base trajectory fm(s) according to the embodiment is shaped similarly to the first derivative for probe trajectory g1(s) or g2(s). Multi-base trajectory fm(s) may be considered as a function generated by extracting fluctuation components from probe trajectories g1(s) and g2(s).

For example, a mobile object in another lane interferes the radio wave reception and may decrease RSSI of the base station radio wave. The mobile object may be absent during reception of the base station radio wave used to generate the base trajectory but may later interfere the reception. In such a case, probe trajectories g1(s) and g2(s) may be shaped largely differently from probe trajectories g1(s) and g2(s) used to generate the base trajectory.

Reception interference due to a mobile object decreases a variation of RSSI in relation to the distance as a whole. However, the tendency of variations in RSSI shows little difference regardless of whether the mobile object is present. Fluctuation components in probe trajectories g1(s) and g2(s) negligibly change even when the mobile object interferes the reception. The use of multi-base trajectory fm(s) generated from applying the evaluation function according to the embodiment can robustly secure the current position estimation accuracy against radio countermeasures due to mobile objects.

The description below explains the process if the determination at S110 results in NO. The controller 53 proceeds to S140 if the determination at S110 results in NO. At S140, the controller 53 determines whether a base trajectory request is issued. The wireless positioning terminal 40 transmits the base trajectory request at S230 in FIG. 11 described later. If the determination at S140 results in NO, the controller 53 terminates the process in FIG. 7. If the determination at S140 results in YES, the controller 53 proceeds to S150.

At S150, the controller 53 extracts multi-base trajectory fm(s) from the base trajectory database 52. Multi-base trajectory fm(s) is determined based on the base trajectory request. At S160, the controller 53 transmits multi-base trajectory fm(s) extracted at S150 from the wide area wireless transceiver 51 to the wireless positioning terminal 40 that transmitted the base trajectory request.

(Process Performed by the Controller 46 of the Wireless Positioning Terminal 40)

Figure 11:
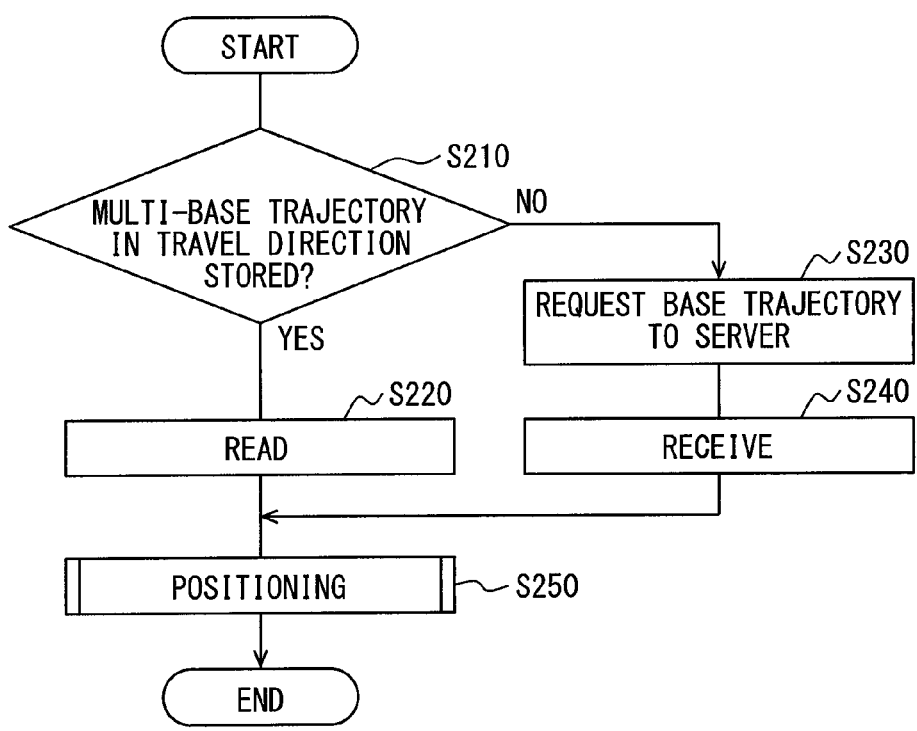
FIG. 11 is a flowchart illustrating a process performed by a controller of the wireless positioning terminal according to the first embodiment.

The controller 46 of the wireless positioning terminal 40 periodically performs the process in FIG. 11. At S210, the controller 46 determines whether the memory 45 stores multi-base trajectory fm(s) corresponding to the travel direction from the current position on a traveling road. The controller 46 compares a moving trajectory of the wireless positioning terminal 40 with trajectories of several coordinates contained in multi-base trajectory fm(s) to determine whether multi-base trajectory fm(s) stored in the memory 45 corresponds to the travel direction from the current position on the traveling road. The controller 46 determines the moving trajectory based on a change in the current position of the traveling vehicle.

To perform the determination at S210, road map data may be provided to store correspondence between multi-base trajectory fm(s) and a road in the road map data. The moving trajectory of the wireless positioning terminal 40 may be applied to the road map data.

If the determination at S210 results in YES, the controller 46 proceeds to S220. The controller 46 reads multi-base trajectory fm(s) corresponding to the travel direction from the current position on the traveling road from the memory 45 into the RAM 49. If the determination at S210 results in NO, the controller 46 proceeds to S230.

At S230, the controller 46 transmits the base trajectory request to the management server 50. The base trajectory request contains a message that signifies a request for the current position, the travel direction, and multi-base trajectory fm(s). The controller 46 performs the process at S150 and S160 when the management server 50 receives the base trajectory request. The controller 46 transmits multi-base trajectory fm(s) to the wireless positioning terminal 40.

At S240, the controller 46 receives multi-base trajectory fm(s) transmitted from the management server 50 and stores multi-base trajectory fm(s) in the RAM 49 and the memory 45.

Figure 12:
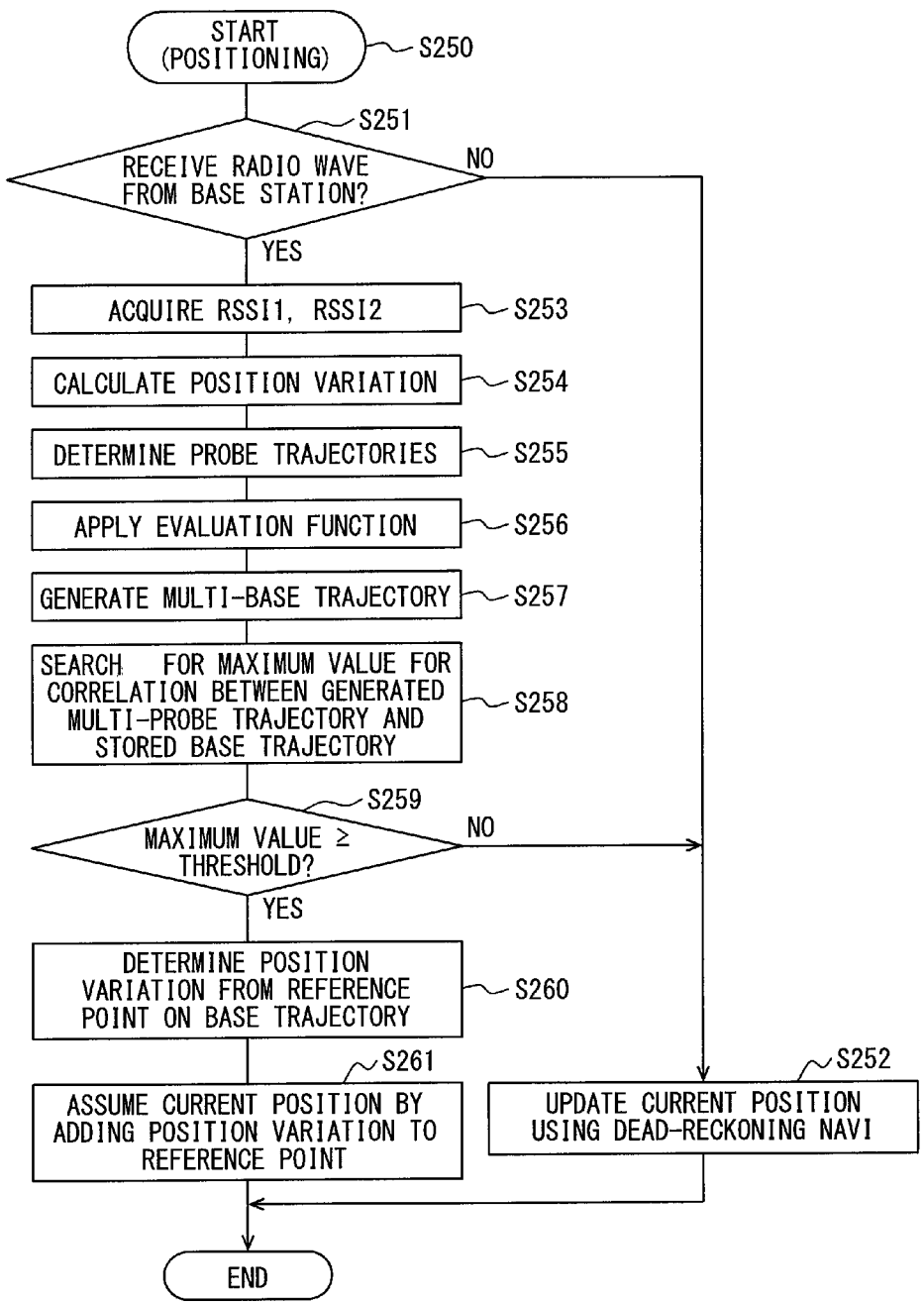
FIG. 12 illustrates in detail a positioning process in FIG. 11.

At S250, the controller 46 performs a positioning process. FIG. 12 illustrates the positioning process in detail. At S251 in FIG. 12, the controller 46 determines whether the base station radio wave is received. The controller 46 proceeds to S252 if no base station radio wave is received.

At S252, the controller 46 updates the current position based on a publicly known dead-reckoning navigation that uses the most recently determined current position and a moving trajectory from the time when the current position was determined. After S252, the controller 46 terminates the process in FIG. 12.

If the determination at S251 results in YES, the controller 46 proceeds to S253. At S253, the controller 46 acquires RSSI1 corresponding to RSSI for the base station radio wave received by the first antenna 41a and RSSI2 corresponding to RSSI for the base station radio wave received by the second antenna 41b.

At S254, the controller 46 calculates position variation s from the determination of YES at S251. The process at S254 corresponds to a position variation calculation section or a position variation calculator. Position variation s provides information containing a distance and a direction. The distance is found by multiplying the vehicle speed indicated by a signal acquired from the vehicle speed sensor 42 and the time elapsed from the execution of previous S254 to the execution of present S254 together. The direction is indicated by a signal acquired from the gyro sensor 33.

At S255, the controller 46 makes a set (i.e., series) out of RSSI1 and position variation s determined most recently at S253 and S254 and generates a probe trajectory from combinations of RSSI1 and position variation s determined hitherto. The controller 46 makes a set (i.e., series) out of RSSI2 and position variation s determined most recently at S253 and S254 and generates a probe trajectory from combinations of RSSI2 and position variation s determined hitherto.

At S256, the controller 46 applies the above-mentioned evaluation function using probe trajectory g1(s) generated from RSSI1 and probe trajectory g2(s) generated from RSSI2. A value resulting from applying the evaluation function corresponds to a multi-link-base reception informational item, a multi-link-base reception parameter or a multi-link-base reception parameter. The process at S256 corresponds to a reception information determination section, a reception information determiner, a reception parameter determiner, or a reception property determiner.

At S257, the controller 46 generates function gm(s) representing a multi-probe trajectory that uses the vertical axis for the value resulting from applying the evaluation function at S256 and the horizontal axis for position variation s. An interval for position variation s in the multi-probe trajectory is assumed to be longer than or equal to a predetermined interval. The interval has a distance of several tens of meters, for example. The controller 46 does not perform the process to generate a multi-probe trajectory and the subsequent part of the process if information longer than or equal to the predetermined interval is not stored. The multi-probe trajectory corresponds to a measured trajectory. The process at S257 corresponds to a trajectory generation section or a trajectory generator.

At S258, the controller 46 searches for a maximum value for the correlation between the multi-probe trajectory generated at S257 and the multi-base trajectory stored in the RAM at 5220 or S240 in FIG. 11 while varying τ.

At S259, the controller 46 determines whether the maximum correlation value determined at S258 is larger than or equal to a predetermined threshold value. If the determination results in NO, the controller 46 proceeds to S252 described above to update the current position based on the dead-reckoning navigation. If the determination at S259 results in YES, the controller 46 proceeds to S260.

At S260, the controller 46 assumes a reference point using a point on the base trajectory such as a point corresponding to a maximum value, a minimum value, a local maximal value, or a local minimal value and determines position variation s from the reference point to the current position on the multi-probe trajectory.

At S261, the controller 46 assumes a current position resulting from adding position variation s to the position corresponding to the reference point assumed at S260. The process at S260 and S261 corresponds to a position estimation section or a position estimator to estimate as a current position of the wireless positioning terminal 40, a current point on the multi-probe trajectory that is moved based on a matching or matching position between the base trajectory stored in the RAM 49 as a base memory at S240 and the multi-probe trajectory as a measured trajectory generated at S257. That is, the multi-probe trajectory, which contains a current point thereon, is moved based on the matching or matching position to be matched with the base trajectory. The current point moved together with the multi-probe trajectory is estimated as the current position of the wireless positioning terminal 40.

Effects of the First Embodiment

According to the first embodiment, the controller 46 of the wireless positioning terminal 40 generates the multi-probe trajectory (S257). The vertical axis of the multi-probe trajectory corresponds to RSSI1-RSSI2. The value of RSSI varies with the position of the wireless positioning terminal 40. The value of RSSI1-RSSI2 therefore varies with the position of the wireless positioning terminal 40.

As described with reference to FIGS. 8 through 10, RSSI1-RSSI2 differs from RSSI1 or RSSI2 in tendency with respect to positional changes of the wireless positioning terminal 40. The multi-probe trajectory (FIG. 10) is therefore shaped differently from a single-probe trajectory or a single-link-base trajectory, which corresponds to each of the probe trajectory in FIG. 8 and the probe trajectory in FIG. 9).

The multi-probe trajectory is shaped differently from the single-probe trajectory and may indicate a large feature in the shape corresponding to a location where the single-probe trajectory indicates a small feature. Therefore, the multi-probe trajectory can highly accurately determine a matching position in relation to the multi-base trajectory. The multi-probe trajectory can highly accurately estimate the current position.

The multi-base trajectory can cause a large feature in the shape and therefore shorten an interval used for matching. The multi-base trajectory increases chances to determine the successful matching despite an increase in the threshold value used at S259 to determine a match. The multi-probe trajectory can quickly and highly reliably estimate the current position.

Second Embodiment

A second embodiment will be described. An element marked with the same reference numeral as that used hitherto may be contained in the description of the second embodiment or later and, in such a case, equals the element marked with the same reference numeral described in the preceding embodiment, unless otherwise specified. When only part of a configuration is described, the other parts of the configuration may conform to the embodiment that is already described.

The second embodiment differs from the first embodiment in positions of the first antenna 31a and the second antenna 31b included in the base measuring terminal 30 and the first antenna 41a and the second antenna 41b included in the wireless positioning terminal 40. According to the second embodiment as in FIG. 13, the first antenna 31a or 41a and the second antenna 31b or 41b are placed in parallel with reference to the width direction of the vehicle 60.

Figure 14:
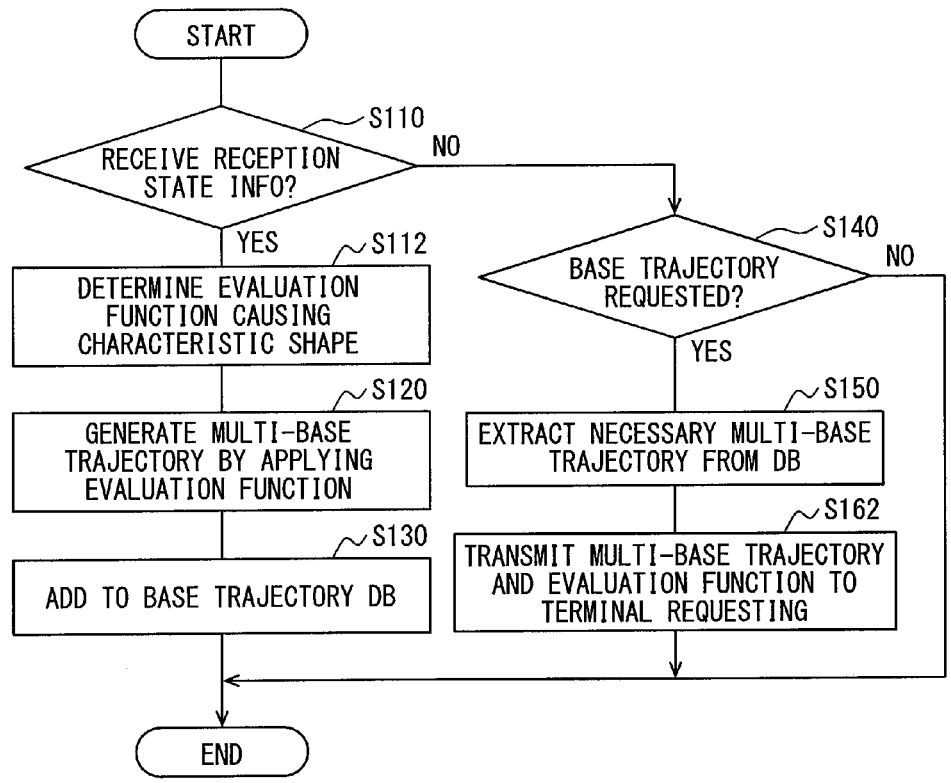
FIG. 14 is a flowchart illustrating a process performed by a controller of the management server according to the second embodiment.

The management server 50 performs a process according to the flowchart in FIG. 14 in place of FIG. 7. FIG. 14 differs from FIG. 7 in addition of S112 and execution of S162 instead of S160.

The management server 50 performs the process at S112 if the determination at S110 results in YES. The second embodiment does not use a predetermined evaluation function. At S112, the management server 50 determines an evaluation function so as to cause a characteristic shape in the multi-probe trajectory. The calculation according to the second embodiment uses the evaluation function that contains complex amplitude.

Equation 7 provides complex representation of the sum of RSSI1 and RSSI2, where RSSI1 denotes RSSI for a signal received by the first antenna 31a and RSSI2 denotes RSSI for a signal received by the second antenna 31b. In equation 7, r denotes RSSI and A denotes the amplitude.

$$r(t,s)=A_1(t,s)e^{j(2\pi f_c t+\theta_1(s))}+A_2(t,s)e^{j(2\pi f_c t+\theta_2(s))}=A(t,s)e^{j2\pi f_c t}(e^{j\theta_1(s)}) \quad (7)$$

$$(\because A_1(t,s)\cong A_2(t,s)\cong A(t,s))$$

Equation 7 is divided into two terms, time t and position variation s. The term of time t provides a constant value if the time is constant. RSSI provides a time averaging value of the amplitude that varies in cycle of a carrier frequency. The sum of RSSIs for two links expressed by equation 7 therefore depends on position variation s (i.e., on a position) but is independent of time t.

Figure 13:
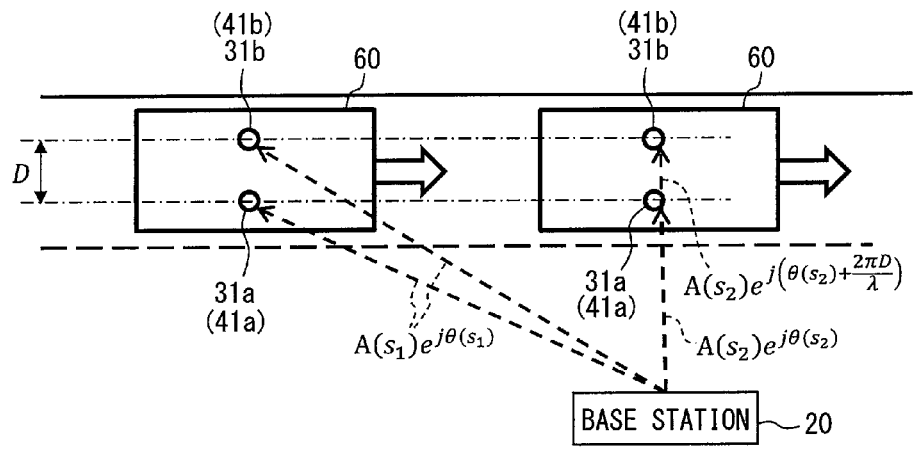
FIG. 13 is a diagram illustrating arrangement of antennas provided for the base measuring terminal and the wireless positioning terminal according to a second embodiment.

Suppose that D denotes an inter-antenna distance. FIG. 13 illustrates a position (hereinafter referred to as a front position) where the direction from the base station 20 to the antenna 31a coincides with the direction from the same to the antenna 31b. At this position, equation 8 expresses the complex amplitude of a signal received by the first antenna 31a. Equation 9 expresses the complex amplitude of a signal received by the second antenna 31b.

$$A(s_2)e^{j\theta(s_2)} \quad (8)$$

$$A(s_2)e^{j(\theta(s_2)+\frac{2\pi D}{\lambda})} \quad (9)$$

The position of the vehicle 60 may be greatly distant from the front position of the base station 20 in the front-back direction of the vehicle 60. In such a case, a phase difference is negligible even if it is found between signals received by the first antenna 31a and the second antenna 31b. In this case, equation 10 expresses the complex amplitude of a signal received by the first antenna 31a or the second antenna 31b.

$$A(s_1)e^{j\theta(s_1)} \quad (10)$$

A phase difference between equations 8 and 9 is $2\pi D/\lambda$. The phase difference results in $\pi$ when inter-antenna distance D is assumed to be $\lambda/2$. When the phase difference is $\pi$, the two complex amplitudes indicate the same value and opposite directions. Phase difference $\pi(2n-1)$, where n=1, 2, and so on, minimizes the sum of two complex amplitudes. Equation 10 maximizes the sum of two complex amplitudes because there is no phase difference between the two complex amplitudes. The use of the sum of two complex amplitudes as the evaluation function causes the maximum value or the minimum value in the multi-probe trajectory and can generate a characteristic shape in the multi-probe trajectory.

Figure 15:
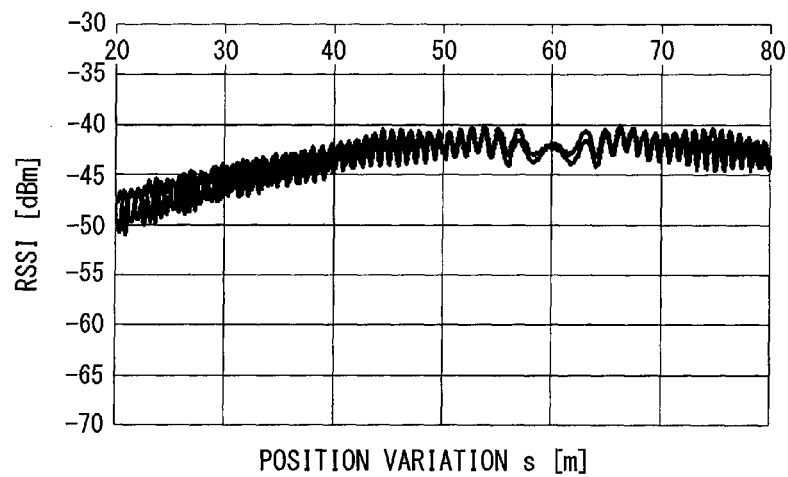
FIG. 15 illustrates a probe trajectory generated from signals received at first and second antennas.
Figure 16:
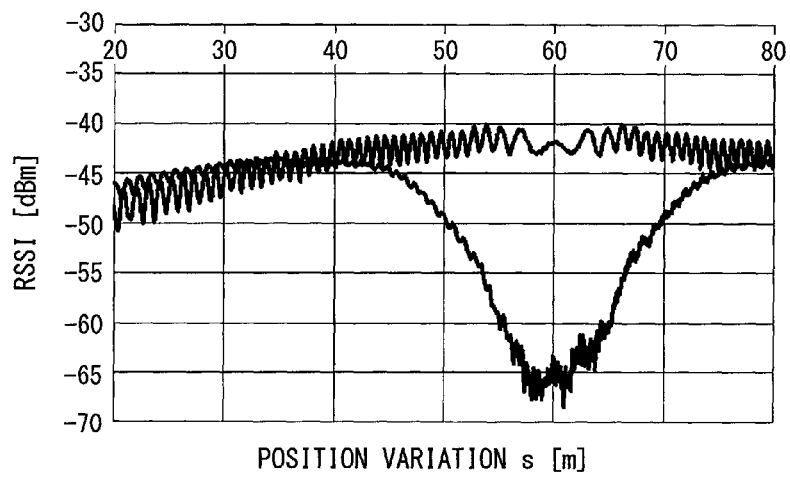
FIG. 16 illustrates a multi-probe trajectory generated from two probe trajectories in FIG. 15.

FIG. 15 illustrates a probe trajectory generated from signals received by the first antenna 31a and the second antenna 31b. These probe trajectories hardly indicate any characteristic shape. Contrastingly, FIG. 16 illustrates a multi-probe trajectory generated from the two probe trajectories in FIG. 15 and indicates a waveform part of which is largely curved downward.

A characteristic shape can be generated in the multi-probe trajectory generated by using the sum of two complex amplitudes as the evaluation function even if the signal does not contain a large characteristic shape in a single-probe trajectory.

The evaluation function is not limited to the sum of two complex amplitudes. The evaluation function may be generated from a difference between two complex amplitudes or may multiply each of complex amplitudes and a weight coefficient together to calculate a sum or a difference. A different evaluation function causes a differently shaped multi-probe trajectory that is generated by applying that evaluation function.

At S112, the management server 50 selects an evaluation function capable of causing a characteristic shape in the multi-probe trajectory from predetermined evaluation functions as candidates. For example, a characteristic shape may be determined to occur when a predetermined interval contains a local minimal value and a difference between the local minimal value and a falling point with reference to the vertical axis is greater than or equal to a specified value. Further, a characteristic shape may be determined to occur when a predetermined interval contains a local maximal value and a difference between the local maximal value and a rising point with reference to the vertical axis is greater than or equal to a specified value. In addition to or in place of these criteria, a characteristic shape may be determined to occur based on the number of local maximal values or local minimal values.

The process conforms to the first embodiment after the management server 50 determines the evaluation function at S112. At S120, the management server 50 applies the evaluation function determined at S112 to generate multi-base trajectory fm(s). At S130, the management server 50 adds multi-base trajectory fm(s) generated at S120 to the base trajectory database 52.

If determining at S140 that a base trajectory request is issued, the management server 50 proceeds to S150 and extracts multi-base trajectory fm(s) based on the base trajectory request from the base trajectory database 52. At S162, the management server 50 transmits multi-base trajectory fm(s) extracted at S150 and the evaluation function used to generate multi-base trajectory fm(s) from the wide area wireless transceiver 51 to the wireless positioning terminal 40 that transmitted the base trajectory request.

Figure 17:
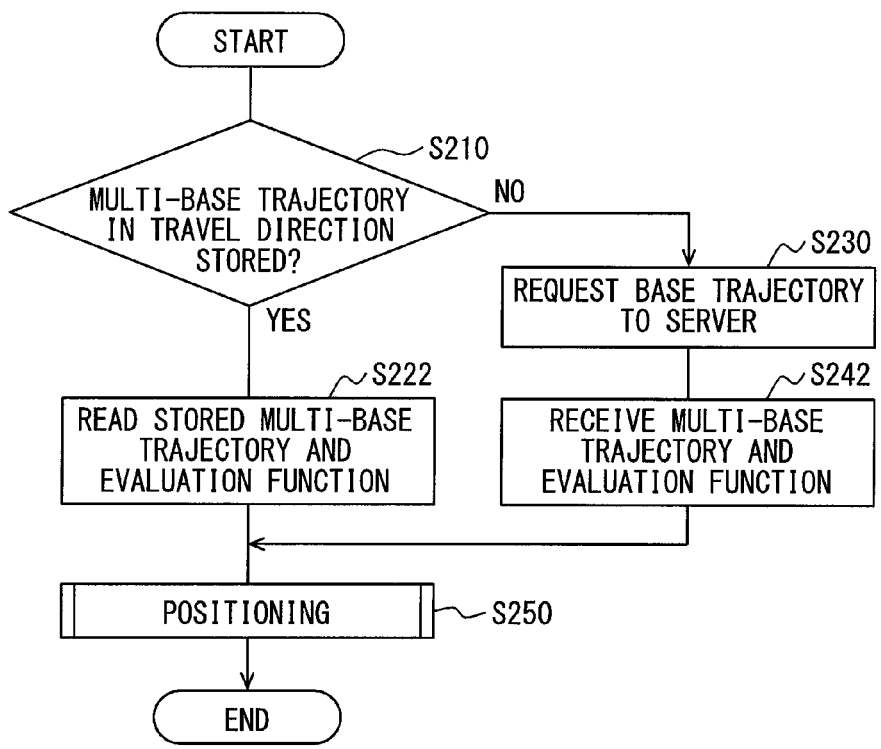
FIG. 17 is a flowchart illustrating a process performed by a controller of the wireless positioning terminal according to the second embodiment.

FIG. 17 illustrates a process performed by the controller 46 of the wireless positioning terminal 40 according to the second embodiment. The wireless positioning terminal 40 according to the second embodiment performs the process in FIG. 17 instead of the process in FIG. 11. FIG. 17 differs from FIG. 11 in that S222 and S242 replace S220 and S240 in FIG. 11.

At S222, the controller 46 reads multi-base trajectory fm(s) corresponding to the travel direction from the current position on the traveling road and the evaluation function from the memory 45 into RAM 49. The evaluation function is received from the management server 50 at S242 described next.

The management server 50 transmits multi-base trajectory fm(s) and the evaluation function by performing the process at S162 in FIG. 14. At S242, the controller 46 receives multi-base trajectory fm(s) and the evaluation function and stores these in RAM 49. The controller 46 also stores multi-base trajectory fm(s) in the memory 45.

Effects of the Second Embodiment

The second embodiment generates the multi-base trajectory and the multi-probe trajectory using the evaluation function containing the complex amplitude. The complex amplitude varies with phases. The phase of the base station radio wave varies with positions. A characteristic shape can occur in the multi-base trajectory and the multi-probe trajectory generated by using the evaluation function containing complex amplitudes even when no characteristic shape occurs in a single-probe trajectory whose vertical axis represents RSSI1 or RSSI2 independent of phases. A characteristic shape can be generated in the multi-base trajectory and the multi-probe trajectory, enabling to estimate a current position highly accurately, highly reliably, and quickly.

Third Embodiment

Figure 18:
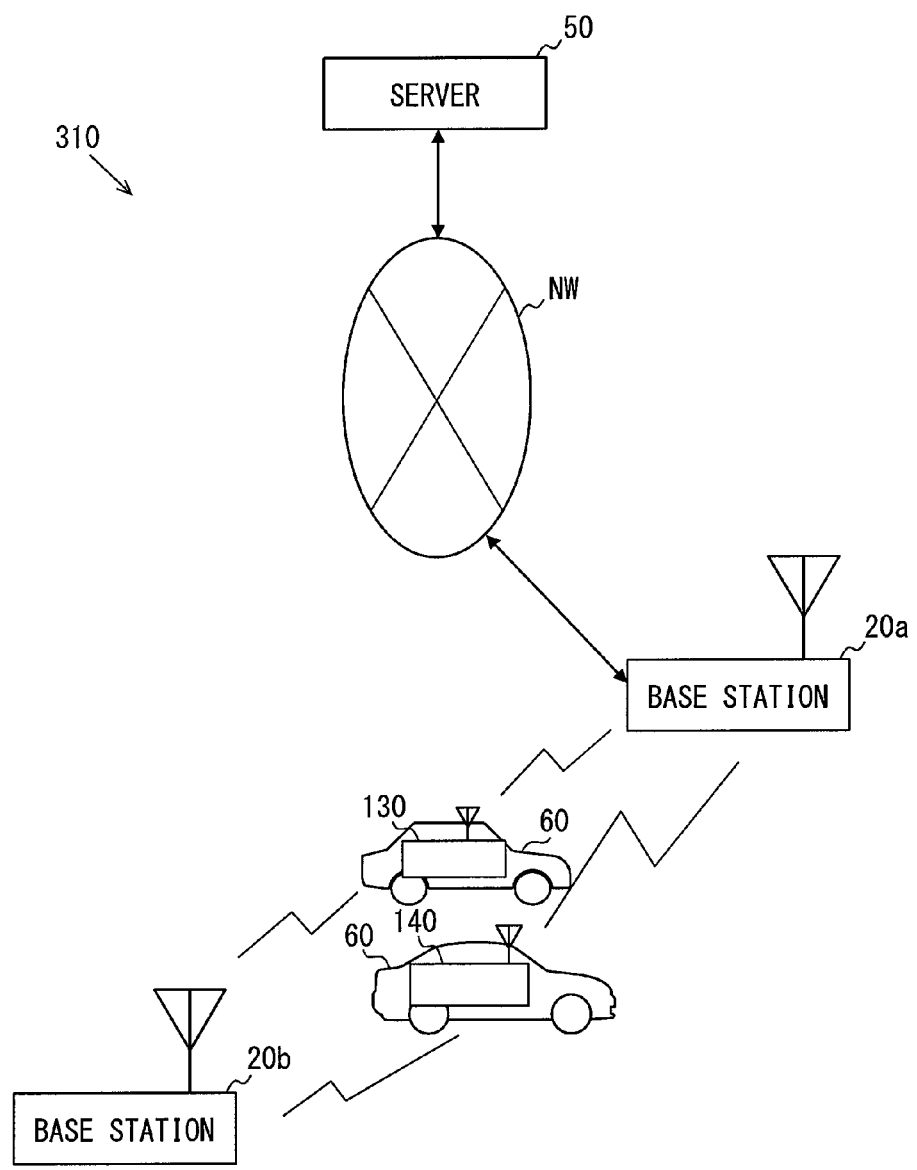
FIG. 18 is an overall configuration diagram illustrating a wireless positioning system according to a third embodiment.

A wireless positioning system 310 according to a third embodiment includes the configuration illustrated in FIG. 18. A difference from the wireless positioning system 10 in FIG. 1 according to the first embodiment is the configuration of the base measuring terminal 130 and the wireless positioning terminal 140. As another difference, the base measuring terminal 130 and the wireless positioning terminal 140 can receive base station radio waves from several (two in FIG. 18) base stations 20a and 20b at the same position or without moving.

In a base measuring terminal 130, the wireless transceiver 31 includes only the first antenna 31a and does not include the second antenna 31b. Otherwise, the base measuring terminal 130 is configured equally to the base measuring terminal 30 according to the first embodiment. In a wireless positioning terminal 140, the wireless transceiver 41 includes only the first antenna 41a and does not include the second antenna 41b. Otherwise, the wireless positioning terminal 140 is configured equally to the wireless positioning terminal 40 according to the first embodiment.

(Process Performed by the Controller 36 of the Base Measuring Terminal 30)

According to the third embodiment, the controller 36 of the base measuring terminal 30 also performs the process in FIG. 6 according to the first embodiment. According to the first embodiment, the wireless transceiver 31 of the base measuring terminal 30 includes two antennas 31a and 31b. However, the wireless transceiver 31 according to the third embodiment includes only the first antenna 31a. The wireless transceiver 31 receives a base station radio wave using two links, one from the base station 20a to the first antenna 31a and the other from the base station 20b to the second antenna 31b. The wireless transceiver 31 can acquire a base station radio wave transmitted from each of the base stations 20a and 20b by identifying the base station radio wave using an ID contained in the base station radio wave.

The controller 36 acquires RSSI1 and RSSI2 from the wireless transceiver 31 if the wireless transceiver 31 receives the base station radio wave (S10: YES). According to the third embodiment, RSSI1 corresponds to RSSI for the base station radio wave received from the base station 20a and RSSI2 corresponds to RSSI for the base station radio wave received from the base station 20b. The process from S30 to S50 equals the first embodiment.

(Process Performed by the Controller 53 of the Management Server 50)

According to the third embodiment, the controller 53 of the management server 50 also performs the process in FIG. 7 according to the first embodiment. However, the evaluation function applied to the reception state information differs from the first embodiment. The third embodiment uses the evaluation function expressed in equations 11 through 13.

$$f_{min}(s) = \min_{i=1,\dots,n} f_i(s) \tag{11}$$

$$f_{max}(s) = \max_{i=1,\dots,n} f_i(s) \tag{12}$$

$$fm(s) = f_{select}(s) = \begin{cases} f_{min}(s), & \int |\nabla f_{min}(s)| ds \geq \int |\nabla f_{max}(s)| ds \\ f_{max}(s), & \int |\nabla f_{min}(s)| ds < \int |\nabla f_{max}(s)| ds \end{cases} \tag{13}$$

Function fmin(s) expressed in equation 11 determines a minimum value in position variation s among several base trajectories corresponding to i=1. . . n. Positions are associated with position variation s as described in the preceding embodiments.

Function fmax(s) expressed in equation 12 determines a maximum value in position variation s among several base trajectories corresponding to i=1... n. The base trajectory uses the probe trajectory unchanged. Function fmin(s) uses a value larger than noise floor level N by specified value α when the minimum value in position variation s is smaller than noise floor level N. Similarly, function fmax(s) uses a value larger than noise floor level N by specified value α when the maximum value in position variation s is smaller than noise floor level N. This is because RSSI at a noise level decreases the reproducibility.

Equation 13 signifies that a variation in fmin(s) and a variation in fmax(s) are compared, and fmin(s) is selected when its variation is larger, or fmax(s) is selected when its variation is larger.

Figure 19:
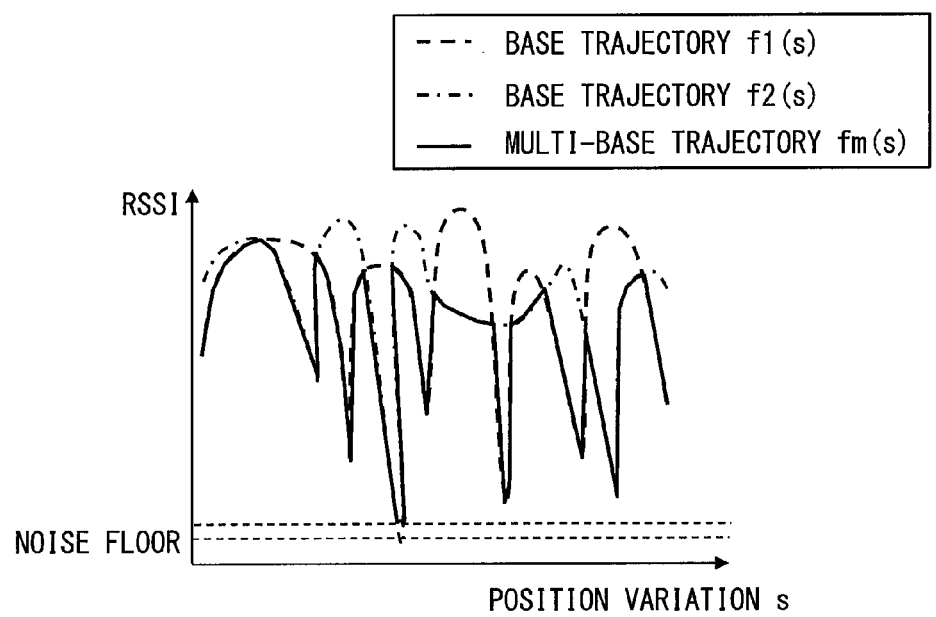
FIG. 19 illustrates multi-base trajectory according to the third embodiment.

With reference to FIG. 19, the description below explains an example of the multi-base trajectory generated by applying the evaluation function. Equations 11 through 13 select one of two base trajectories f1(s) and f2(s) under the condition that one of the base trajectories causes a larger variation in RSSI at each of positions than the other. The selected base trajectory is used as multi-base trajectory fm(s). Consequently, multi-base trajectory fm(s) is shaped as represented by a solid line.

Multi-base trajectory fm(s) compares fmin(s) with fmax(s) and selects one of these that causes a larger variation of RSSI. In many cases, fmin(s) causes a larger variation. Here, fmin(s) is therefore selected more often. The description below explains why fmin(s) causes a larger variation in many cases. The value of RSSI greatly lowers (to decrease the minimum value) when phasing or shadowing occurs. Contrastingly, the maximum value depends on transmission power, directional gain, or complex-valued path gain. The maximum value does not often increase depending on positions.

(Process Performed by the Controller 46 of the Wireless Positioning Terminal 40)

According to the third embodiment, the controller 46 of the wireless positioning terminal 40 also performs the processes in FIGS. 11 and 12 according to the first embodiment. Similarly to the management server 50, the controller 46 applies the evaluation function expressed in equations 11 through 13 to the reception state information. At S253 in FIG. 12, the controller 46 acquires the same RSSI1 and RSSI2 as those acquired by the base measuring terminal 30. Namely, RSSI1 corresponds to RSSI for the base station radio wave received from the base station 20*a* and RSSI2 corresponds to RSSI for the base station radio wave received from the base station 20*b*.

The third embodiment generates the multi-base trajectory and the multi-probe trajectory by applying the evaluation function expressed in equations 11 through 13. As in FIG. 19, the multi-base trajectory contains more characteristic shapes than a single base trajectory. The embodiment can estimate a current position highly accurately, highly reliably, and quickly.

While there have been described specific preferred embodiments of the present disclosure, the present disclosure is not limited thereto but the technical scope of the present disclosure includes the following modifications. Furthermore, the present disclosure may be otherwise variously embodied within the spirit and scope of the present disclosure.

<First Modification>

In the third embodiment, the process may determine whether the variation in fmax(s) is larger than or equal to a specified value before comparing the variation in fmin(s) with the variation in fmax(s). If the variation in fmax(s) is larger than or equal to a specified value, the process may select fmax(s) without comparing the variation in fmin(s) with the variation in fmax(s).

The determination whether the variation in fmax(s) is larger than or equal to a specified value signifies the determination whether the trajectory represented by fmax(s) contains a sufficiently characteristic shape. fmax(s) is therefore selected if the trajectory represented by fmax(s) contains a sufficiently characteristic shape.

Function fmax(s) provides better reproducibility of trajectories. A first modification can estimate a current position more highly accurately, highly reliably, and quickly.

<Second Modification>

In the third embodiment, equation 13 may be replaced by equation 14. In equation 14, N(s) denotes a link number (i.e., a communication link number for designating a specific one of the communication paths or links), which may serve as a multi-link-base informational item or a multi-link-base parameter.

$$fm(s) = N(s) = \underset{i=0,\dots,n}{\mathrm{argmin}} f_i(s) \qquad (14)$$

Equation 15 defines f0(s) in equation 14.

$$f_0(s) = N + \sigma \qquad (15)$$

Equation 14 contains fm(s) as the link number corresponding to the minimum value in position variation s in several base trajectories corresponding to i=1... n. A multi-base trajectory generated by applying this evaluation function is therefore shaped into a digital waveform whose vertical axis uses only integer values.

This shape can reduce the data size of the multi-base trajectory and can shorten the process time to compare the multi-base trajectory with the multi-probe trajectory.

<Third Modification>

The second embodiment provides several evaluation function candidates to cause a characteristic shape in the multi-base trajectory. Inter-antenna distance D may be adjusted to cause a characteristic shape in the multi-base trajectory. A phase difference between base station radio waves received by the two antennas 31*a* and 31*b* varies with inter-antenna distance D. When the evaluation function contains complex amplitude, adjusting inter-antenna distance D can vary the multi-base trajectory shape.

The description below explains an example of adjusting inter-antenna distance D when the first antenna 31*a* and the second antenna 31*b* are placed in parallel with reference to the width direction of the vehicle 60 similarly to the second embodiment. Suppose that the multi-base trajectory contains a characteristic shape caused by a dip of 3 dB or more, namely, a difference of 3 dB or more between the local minimal value and falling point, near the front position of the base station 20. In this case, inter-antenna distance D just needs to satisfy the range expressed in equation 16.

$$\frac{\lambda}{3}(2n-1) \leq D \leq \frac{\lambda}{2}(2n-1) \ (n=1,2,\dots) \qquad (16)$$

<Fourth Modification>

The third embodiment receives base station radio waves using several links by providing the two antennas 31*a* and 31*b* for the wireless transceiver 31 of the base measuring terminal 30 and the two antennas 41a and 41b for the wireless transceiver 41 of the wireless positioning terminal 40. However, the method of receiving base station radio waves using several links is not limited thereto.

Several links can receive base station radio waves even when the several base stations 20 transmit base station radio waves as described in the third embodiment. The single base station 20 may transmit base station radio waves from several antennas.

Suppose that the evaluation function contains complex amplitude and several antennas are used for at least one of the transmission side and the reception side. In such a case, changing the antenna position can change the position that causes a characteristic shape in the multi-base trajectory.

<Fifth Modification>

When the evaluation function contains complex amplitude, several links can cause a characteristic shape in the multi-base trajectory. The links may use a direct path and a multi-path. The direct path receives a base station radio wave that is transmitted from the base station 20 and does not reflect off a building or a road. The multi-path receives the base station radio wave that reflects off a building or a road A radio wave reflector may be placed at a specified distance from the base station antenna to generate the multi-path. A radio wave reflector may be placed at specified distances from the wireless transceivers 31 and 41 to generate the multi-path.

<Sixth Modification>

There may be three or more links while the embodiments use two links.

<Seventh Modification>

According to the embodiment, the base measuring terminal 30 transmits the reception state information to the management server 50. The reception state information may be transmitted to the base station 20. In this case, the base station 20 performs the process in FIG. 7 or 14 performed by the management server 50. The wireless positioning terminal 40 transmits a base trajectory request to the base station 20.

<Eighth Modification>

The base measuring terminal 30 can generate a multi-base trajectory. Furthermore, the wireless positioning terminal 40 may include the function of the base measuring terminal 30. In this case, the wireless positioning terminal 40 performs the function of the base measuring terminal 30 when the vehicle travels a road for which no multi-base trajectory is stored. The wireless positioning terminal 40 performs its function described in the embodiment to generate a multi-probe trajectory and estimate the current position when the vehicle travels a road for which the multi-base trajectory is stored. In addition to estimation of the current position, the wireless positioning terminal 40 may regenerate a multi-base trajectory and average the regenerated multi-base trajectory and the already stored multi-base trajectory to update the multi-base trajectory. This can improve the accuracy of the current position estimation.

<Ninth Modification>

RSSI may be replaced by TOF or an angle of arrival of radio wave similarly to patent literature 1.

While the present disclosure has been described with reference to preferred embodiments thereof, it is to be understood that the present disclosure is not limited to the preferred embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

What is claimed is:

1. A wireless positioning terminal including a wireless receiver to receive, as a plurality of reception signals, signals wirelessly from at least one wireless transmitter via a plurality of different communication links that are mutually different from each other, the wireless positioning terminal comprising:
  a reception information determiner to successively determine a multi-link-base reception informational item by evaluating the plurality of reception signals respectively corresponding to the different communication links, the multi-link-base reception informational item having a value varying with a position of the wireless positioning terminal, the multi-link-base reception informational item varying with a position of the wireless positioning terminal differently from an informational item of a reception signal received by the wireless receiver via one of the different communication links;
  a base memory to store a base trajectory that represents correspondence relation about a plurality of points between (i) a position of the wireless positioning terminal and (ii) the multi-link-base reception informational item;
  a position variation calculator to successively calculate a position variation in the wireless positioning terminal;
  a trajectory generator to generate a measured trajectory that represents correspondence relation about a plurality of points between (i) the position variation calculated by the position variation calculator and (ii) the multi-link-base reception informational item determined by the reception information determiner; and
  a position estimator to estimate, as a current position of the wireless positioning terminal, a current point on the measured trajectory that is moved based on matching between the base trajectory stored in the base memory and the measured trajectory generated by the trajectory generator.

2. The wireless positioning terminal according to claim 1, wherein the reception information determiner determines the multi-link-base reception informational item by applying a predetermined evaluation function to a plurality of single-link-base reception informational items, the single-link-base reception information items being of the reception signals received by the wireless receiver, respectively, via the different communication links.

3. The wireless positioning terminal according to claim 2, wherein the evaluation function includes a complex amplitude.

4. The wireless positioning terminal according to claim 2, wherein the evaluation function determines the multi-link-base reception informational item based on a subject single-link-base reception informational item, the subject single-link-base reception informational item indicating a larger change against a positional change at each position of the wireless positioning terminal among the plurality of single-link-base reception informational items.

5. The wireless positioning terminal according to claim 4, wherein the evaluation function equates the multi-link-base reception informational item corresponding to each position of the wireless positioning terminal with a value of the subject single-link-base reception informational item.

6. The wireless positioning terminal according to claim 4, wherein the evaluation function equates the multi-link-base reception informational item corresponding to each position of the wireless positioning terminal with one of the communication links corresponding to the subject single-reception informational item.

* * * * *